No. 696,656. Patented Apr. 1, 1902.
F. DE P. ROMANI.
AUTOMATIC AND INSTANTANEOUS APPARATUS FOR PRODUCING PHOTOGRAPHS.
(Application filed Feb. 5, 1900.)
(No Model.) 2 Sheets—Sheet 1.
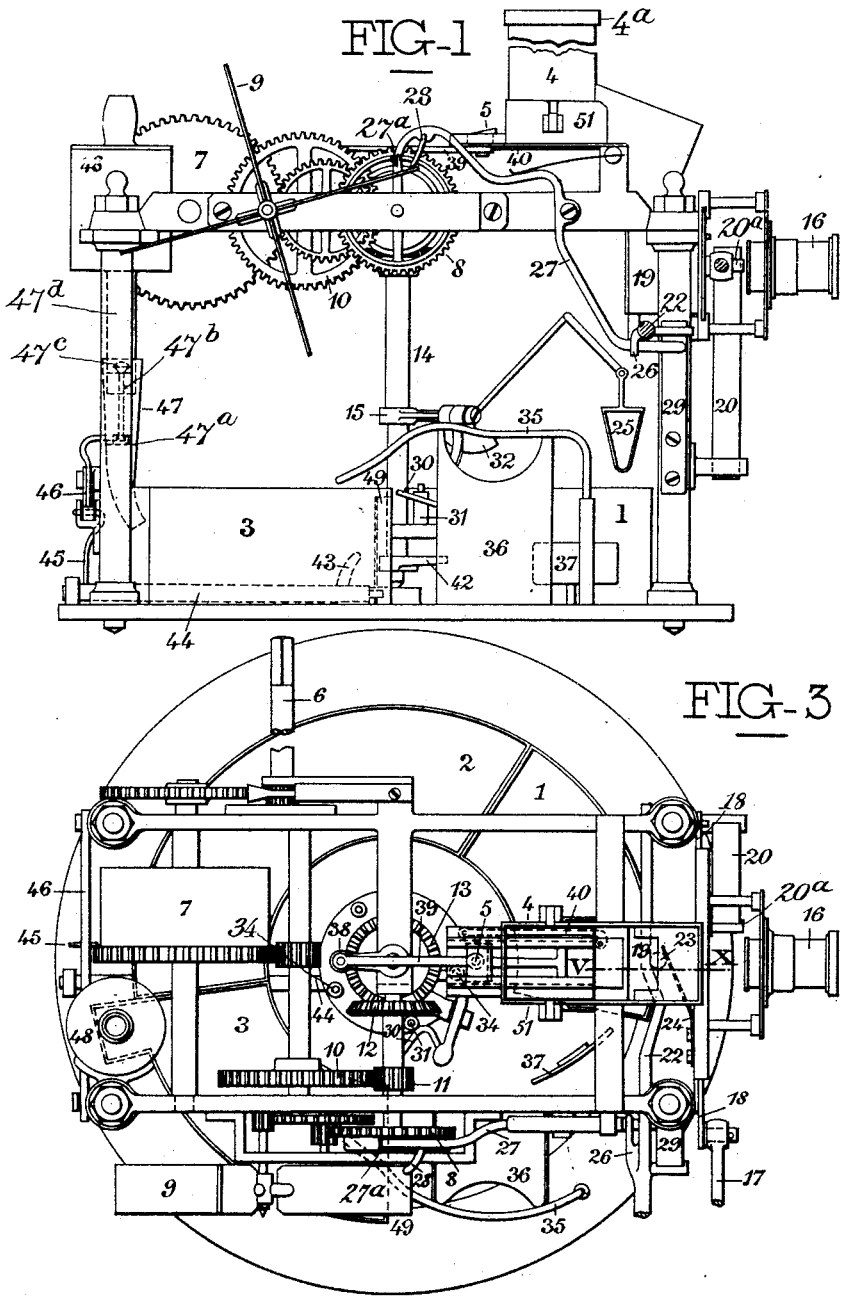
Witnesses
Georges Freydier Dubreuil
Jean Germain
Inventor
François de Paula Romani No. 696,656. Patented Apr. 1, 1902.
F. DE P. ROMANI.
AUTOMATIC AND INSTANTANEOUS APPARATUS FOR PRODUCING PHOTOGRAPHS.
(Application filed Feb. 5, 1900.)
(No Model.) 2 Sheets—Sheet 2.
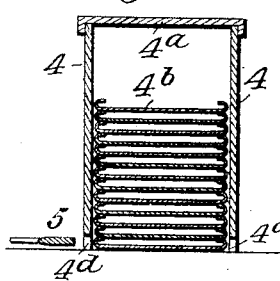
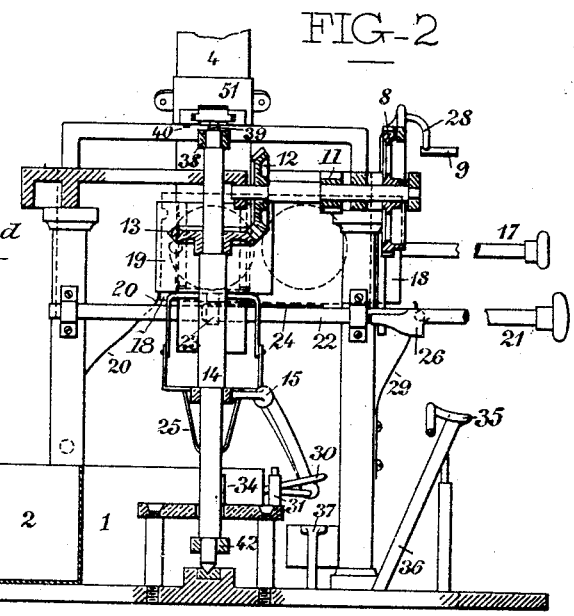
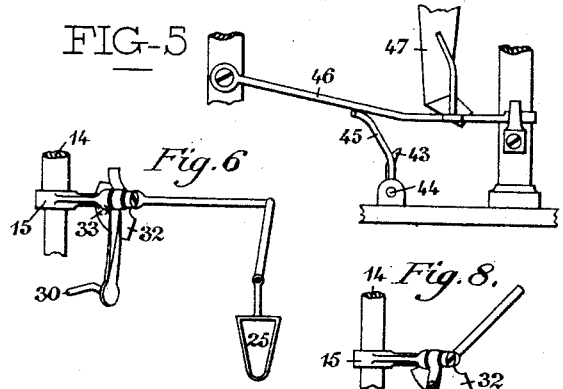
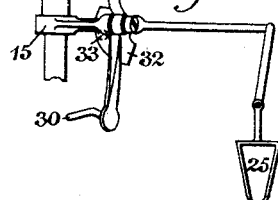
Witnesses
Georges Freyder-Dubreul
Jean Germani
Inventor
François de Paula Romani
THE NORRIS PETERS CO., PHOTO-LITHO., WASHINGTON, D. C.

UNITED STATES PATENT OFFICE.

FRANÇOIS DE PAULA ROMANI, OF LYONS, FRANCE.

AUTOMATIC AND INSTANTANEOUS APPARATUS FOR PRODUCING PHOTOGRAPHS.

SPECIFICATION forming part of Letters Patent No. 696,656, dated April 1, 1902.

Application filed February 5, 1900. Serial No. 4,019. (No model.)

*To all whom it may concern:*

Be it known that I, FRANÇOIS DE PAULA ROMANI, chemist, a subject of the King of Spain, residing at Lyons, in the Republic of France, (whose post-office address is 31 Rue de l'Hotel de Ville, Lyons,) have invented certain new and useful Improvements in Automatic and Instantaneous Apparatus for Producing Photographs, (patented in France, No. 290,552, dated July 7, 1899, and in Luxemburg, No. 3,846, dated December 11, 1899, and applications deposited as follows: in England December 14, 1899; in Belgium December 9, 1899; in Spain December 22, 1899; in Italy December 20, 1899; in Switzerland December 15, 1899; in Portugal December 14, 1899; in Tunisia December 14, 1899; in Russia December 4/16, 1899; in Sweden December 18, 1899; in Norway December 18, 1899; in Denmark December 16, 1899; in Germany January 4, 1900; in Austria January 13, 1900, and in Hungary January 18, 1900,) of which the following is a specification.

This invention has for its object an automatic and instantaneous apparatus for the production on metallic plates of permanent photographs of any persons, children, or the like fixed and framed in less than a minute.

The invention will be described with reference to the accompanying drawings, in which—

Figure 1 is a side elevation of the apparatus, the outer inclosing case being omitted to expose the mechanism to view; Fig. 2, a vertical cross-section through the axis of the apparatus seen from the rear; Fig. 3, a plan; Fig. 4, a detail in section on the line V X of Fig. 3; Fig. 5, an end elevation of the movement for actuating the clean-water valves; Fig. 6, a front elevation, and Fig. 7 a plan, of the movement of the basket in its lower position; Fig. 8, a front elevation, and Fig. 9 a plan, of the movement of the basket in its upper position; Fig. 10, a side view of the basket when returned to allow the frame carrying the finished photographic plate to be discharged; Fig. 11, a vertical projection of the spring with its upper knob or catch serving to cause the frame to be discharged with certainty. Fig. 12 is a plan, and Fig. 13 an elevation, of a metallic frame for holding the two parts of the sensitive plate. Fig. 14 is a section, on an enlarged scale, of the rectangular tube for holding the plates.

Similar letters of reference indicate the same parts in the different figures.

The apparatus about to be described is inclosed in the usual light-tight box or casing, which for the purpose of illustrating the inclosed mechanism is omitted from the drawings.

The operator having filled his developing-baths 1, fixing-baths 2, and washing-baths 3, arranges a rectangular tube 4 in a casing 51, (without admitting any light.) The said rectangular tube is about twenty-five centimeters in height, closed at the upper end by a cap $4^a$, and contains frames $4^b$, with sensitive plates, the said tube resting at the bottom by means of two feet $4^c$ in the casing 51 and having grooves or notches $4^d$ on one side to allow of the passage of the pusher 5 and on the other side for the passage of a frame $4^b$. The operator then by means of a spindle 6, the square end of which projects outside the box and receives a key or crank, (not shown,) winds up a strong clockwork-movement, with a spring-barrel 7, the wheel of which sets in motion various pinions and toothed wheels, one of which, 8, has a notched rim. On the axis of the smallest pinion a fly 9 is fixed.

The movement of the different parts is imparted by the wheel 10 to a pinion 11, on the spindle of which is mounted a bevel-gear 12, operating by means of a bevel-gear 13, a vertical spindle 14, carrying the support 15 for the movement of the basket 25, and the cam 42 for opening the clean-water pipe.

In explaining the working I will indicate all the parts.

The operator poses his subject at a suitable distance before a screen and opposite the objective 16. He then presses the button 17, the spindle of which has a plate 18 covering the sensitive plates in a little dark chamber 19, opposite the objective and having at its front an aperture of the dimension of the objective and in line with the same. On pressing the button the aperture of the plate or shutter is placed in front of the objective and the sensitive plate exposed. Then he lets go the button or knob, and the plate, under the impulse of a spring 20, which bears at its upper end against a projection $20^a$ on the plate, resumes its position, covering the photograph. He then presses a knob 21, also placed outside the box, and holds it for an instant. This knob 21 is fixed on a bent rod 22, which is thus pushed against a stud 23 to operate a sliding plate 23ª against the pressure of a spring 24, the edge of which sliding plate holds erect the frame carrying the exposed plate. On the sliding plate being thus forced back the frame drops into the basket 25. At the same time as this bent rod causes the sliding plate to uncover it presses also with an inclined part or cam 26 on an elbow-lever 27, the point of which is engaged in a notch 27ª, formed in the rim of the wheel 8 of the clockwork-train, and causes the end of the lever to rise and release the wheel 8. This movement also causes a finger 28, which is carried by the lever 27 and which engages a wing of the fly 9, to rise and release the fly, and the apparatus is started in movement, the point of the lever slipping on the rim. Upon releasing the knob 21 the rod 22 under the impulse of a spring 29 returns to its normal position. The basket 25, which was raised, is held by an elbow-lever 30, one end of which engages a roller 31 and one arm of which bears on a cam 32, which carries the basket, and upon the lever quitting the roller 31 the basket drops into the developing-bath 1, where it is held in a low position by a stud 33, fixed on the cam and engaging under the supporting-arm 15, forming the pivot of the movement, and which is keyed on the vertical shaft 14. It remains an instant in the low position, turning in this bath. When the lower arm of the lever 30 encounters a second roller 34, the other arm bears on the cam and causes the basket to rise in order to pass from the developing-bath 1 into the fixing-bath 2. The same movements are performed for the passage of the basket from the fixing-bath 2 into the washing-bath 3 and its exit from the latter. As the basket emerges from the bath 3 it is held in its elevated position and passes along the outside of a guide-track 35, which track extends upward and gradually outward, as shown in Figs. 1 and 2, its highest point being about the level of the upper edge of the basket. As the basket is carried along at the outside of the track the latter acts to turn or push the lower end of the basket outward, and by the time it arrives at the elevated part of the track it has been turned completely over, as shown in Fig. 10. In this position the contents are discharged and slide down a chute 36. The lever of the basket continues to descend, and the basket escapes from the track, assuming the lowest position. As it receives an oscillating movement through its fall, a stop 37 is provided, which stops the said movement. The basket then rises, the lower arm of the lever being pushed, and the other arm of the lever bearing on the cam places itself under the chamber 19, where it is stopped, because the wheel 8, which has a stop-notch 27ª, has made one revolution, so that the point of the elbow-lever 27 engages in the notch, and the finger 28 bears against a wing of the fly, thus arresting the clockwork movement.

The vertical shaft 14 carries at its upper end a crank 38, connected by a link 39 with a pusher sliding in the support of the tube 4, the wrist of the crank being at the opposite side of the disk when the stop takes place. When movement is started, the crank turns and moves the link 39 with it, which with its slide or pusher forces out a frame bearing a sensitive plate, and when the pusher is at the end of its course the plate tilts and falls between two grooves in the chamber 19, ready to be exposed. In case this frame by reason of notches or splinters on its edges or for any other reason should remain sticking in the opening of the dark chamber and should not tilt or fall a small spring 40 is arranged, having a stud 41, (see Figs. 4 and 11,) beveled at one side and notched at the other, which spring is pushed into the path of the pusher, but emerges again immediately when the pusher is returned, and which engages between the wall of the tube and the frame, thus lifting the latter. On the bottom of the vertical shaft 14 is fixed a cam 42, the projection of which lies in the direction of the basket on the stoppage of the movement. When the apparatus is in movement and the basket immersed in the clean water, the cam 42 on spindle 14 encounters an arm 43, carried by a horizontal rock-shaft 44, on which is a bent arm 45, as shown in Fig. 5. In the tilting movement produced by the cam bearing against the arm of said rock-shaft the bent arm 45 lifts a lever 46, attached to a hopper 47, having on its interior a cross-piece 47ª, Fig. 1, engaging under a rod 47ᵇ of a valve 47ᶜ of the discharge-pipe 47ᵈ of the water-reservoir 48. When the valve is thus opened, water flows through the beak of the hopper or funnel into bath 3 and continues so long as the cam 42 touches the arm 43, and the overflow escapes by an overflow-pipe 49, Fig. 1, provided at the bottom with a discharge-hole. The cam 42 having passed over the arm, the weight of the lever 46 and of the hopper causes the shaft to resume its first position, and the valve is closed. All these operations from the exposure up to the placing in the frame only last thirty seconds.

I declare that what I claim is—

1. A system of automatic and instantaneous apparatus for producing completely-finished photographs having in combination a clockwork-movement with a fly-regulator for actuating the apparatus said apparatus comprising a wheel having a stop-notch on the rim, an elbow-lever 27 adapted to drop with its point in said notch at the end of each revolution of the said wheel and carrying a finger which thereupon engages a wing of the fly and thus arrests the movement, a rod 22 adapted to be operated from the exterior and having an inclined piece adapted to bear on the bottom of an elbow-lever and lift it in order to release the wing of the fly to restart the movement, a vertical shaft operated by the clockwork-movement, and having at the top a crank with a link for pushing a sensitive plate in a dark chamber, and a hinged basket for receiving the exposed plate, substantially as hereinbefore set forth.

2. In an automatic apparatus for producing finished photographs, the combination of a rectangular tube 4 adapted to contain a large number of thin-metal frames bent over at the edges for retaining the sensitive plates, a recessed casing to receive said tube and provided with a support in which slides a pusher, a rod connected with a crank carried by the operating-spindle said rod adapted to move said pusher beneath the tube and cause a frame to fall in the dark chamber 19 toward the objective, and a spring placed between the tube and the frame at its exit to prevent any sticking of the latter, substantially as described.

3. In an automatic apparatus for producing finished photographs the combination of a basket 25, a dark chamber 19, a slide adapted to support plates in said chamber, an elbow-rod 22 adapted to encounter the slide and discharge a plate into the basket, a series of baths separated by partitions, means for raising the basket over the partitions, said means comprising a cam-arm carrying the basket, a spindle on which it is mounted, an elbow-lever having its upper arm bearing on the cam-arm, rolls adapted to be encountered by the lower arm of the lever, and a stud on said cam-arm for arresting the basket in its lower position.

4. In an automatic apparatus for producing photographs the combination with a pivoted basket, of means for moving it in a predetermined path, a fixed guide-track 35 extending outward of the path of the basket adapted to be encountered by the basket and serving to tilt the same on its axis and discharge its contents.

In witness whereof I have hereunto signed my name, this 24th day of January, 1900, in the presence of two subscribing witnesses.

FRANÇOIS DE PAULA ROMANI.

Witnesses:
GEORGES FREYDIER DUBREUL,
JEAN GERMAIN.